(12) United States Patent  (10) Patent No.: US 9,316,736 B2
Alameh et al.  (45) Date of Patent: Apr. 19, 2016

(54) ELECTRONIC DEVICE AND METHOD FOR DETECTING PRESENCE AND MOTION

(71) Applicant: MOTOROLA MOBILITY LLC, Libertyville, IL (US)

(72) Inventors: Rachid Mohsen Alameh, Crystal Lake, IL (US); Patrick J. Cauwels, South Beloit, IL (US); Jun Jiang, Lake Zurich, IL (US); Kenneth A. Paitl, West Dundee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 9 days.

(21) Appl. No.: 14/103,902

(22) Filed: Dec. 12, 2013

(65) Prior Publication Data

US 2015/0072742 A1  Mar. 12, 2015

Related U.S. Application Data

(60) Provisional application No. 61/876,691, filed on Sep. 11, 2013.

(51) Int. Cl.
*H04B 1/38* (2015.01)
*G01S 17/50* (2006.01)
(Continued)

(52) U.S. Cl.
CPC .............. *G01S 17/50* (2013.01); *G01J 1/0407* (2013.01); *G01J 1/42* (2013.01); *G01J 5/0025* (2013.01);
(Continued)

(58) Field of Classification Search
CPC ...... H01Q 1/243; H04B 1/3833; H04B 1/385; H04B 1/38; H04M 1/0214; H04M 1/72519; H04M 1/72522; H04W 88/02; G01J 5/20; G01J 5/08; G01J 5/16; G01J 5/12
USPC .......... 455/90.2, 90.3, 550.1, 575.1; 250/342, 250/349

See application file for complete search history.

(56) References Cited

U.S. PATENT DOCUMENTS 4,769,697 A   9/1988  Gilley et al.
4,930,236 A   6/1990  Hart
(Continued)

FOREIGN PATENT DOCUMENTS

DE  197 18 911 A1   11/1998
EP    2515526 A2    4/2012
(Continued)

OTHER PUBLICATIONS

Office Action from U.S. Appl. No. 14/103,922, dated Nov. 17, 2014, 12 pp.
(Continued)

*Primary Examiner* — Nhan Le
(74) *Attorney, Agent, or Firm* — Shumaker & Sieffert, P.A.

(57) ABSTRACT

An electronic device for detecting presence and motion includes a housing, a first infrared ("IR") sensor, and a second IR sensor. The housing includes a first corner having a first plurality of openings formed thereon, and a second corner having a second plurality of openings formed thereon. The first IR sensor is disposed proximate to the first corner and has an unobstructed path and line of sight to outside of the electronic device via the first plurality of openings. The second IR sensor is disposed proximate to the second corner and has an unobstructed path and line of sight to outside of the electronic device via the second plurality of openings. The openings of the first plurality of openings are oriented toward the first IR sensor in different directions. The openings of the second plurality of openings are oriented toward the second IR sensor in different directions.

29 Claims, 15 Drawing Sheets

(51) Int. Cl.

| | | |
|---|---|---|
| *G01J 1/04* | (2006.01) | |
| *G01J 5/26* | (2006.01) | |
| *G01J 5/34* | (2006.01) | |
| *G01S 17/02* | (2006.01) | |
| *G01J 1/42* | (2006.01) | |
| *G01J 5/00* | (2006.01) | |
| *H04M 1/02* | (2006.01) | |
| *G01J 5/12* | (2006.01) | |
| *G01J 5/08* | (2006.01) | |
| *H04M 1/725* | (2006.01) | |
| *G06F 3/01* | (2006.01) | |
| *G01V 8/10* | (2006.01) | |

(52) U.S. Cl.
CPC ............. *G01J 5/0818* (2013.01); *G01J 5/12* (2013.01); *G01J 5/26* (2013.01); *G01J 5/34* (2013.01); *G01S 17/026* (2013.01); *G06F 3/017* (2013.01); *H04M 1/026* (2013.01); *H04M 1/72519* (2013.01); *G01V 8/10* (2013.01); *H04M 2250/12* (2013.01)

(56) References Cited

U.S. PATENT DOCUMENTS

| | | | |
|---|---|---|---|
| 5,017,783 A | 5/1991 | Mousavi | |
| 5,111,115 A | 5/1992 | Ball et al. | |
| 5,368,038 A | 11/1994 | Fraden | |
| 5,491,467 A | 2/1996 | Tracy et al. | |
| 5,694,498 A | 12/1997 | Manasson et al. | |
| 5,933,082 A | 8/1999 | Abita et al. | |
| 6,477,391 B1 * | 11/2002 | Muramatsu et al. | 455/550.1 |
| 6,956,564 B1 | 10/2005 | Williams | |
| 7,203,513 B2 * | 4/2007 | Kakuguchi | 455/550.1 |
| 8,344,325 B2 | 1/2013 | Merrell et al. | |
| 8,643,628 B1 | 2/2014 | Eriksson et al. | |
| RE44,855 E | 4/2014 | Williams | |
| 2002/0135474 A1 | 9/2002 | Sylliassen | |
| 2003/0132974 A1 | 7/2003 | Bodin | |
| 2004/0013377 A1 | 1/2004 | Han | |
| 2004/0020699 A1 | 2/2004 | Zalila et al. | |
| 2004/0135688 A1 | 7/2004 | Zhevelev et al. | |
| 2005/0277447 A1 | 12/2005 | Buil et al. | |
| 2005/0288591 A1 | 12/2005 | Kondoh et al. | |
| 2006/0069478 A1 | 3/2006 | Iwama | |
| 2007/0137462 A1 | 6/2007 | Barros et al. | |
| 2008/0106527 A1 | 5/2008 | Cornish et al. | |
| 2008/0219672 A1 | 9/2008 | Tam et al. | |
| 2008/0220831 A1 | 9/2008 | Alameh et al. | |
| 2009/0024041 A1 | 1/2009 | Cho et al. | |
| 2009/0028674 A1 | 1/2009 | Woo et al. | |
| 2009/0146840 A1 | 6/2009 | Hess et al. | |
| 2009/0247224 A1 | 10/2009 | Postoyko | |
| 2009/0247244 A1 * | 10/2009 | Mittleman et al. | 455/575.1 |
| 2010/0049401 A1 | 2/2010 | Watanabe et al. | |
| 2010/0152644 A1 | 6/2010 | Pesach et al. | |
| 2010/0294938 A1 | 11/2010 | Alameh et al. | |
| 2011/0007035 A1 | 1/2011 | Shai | |
| 2011/0050643 A1 * | 3/2011 | Zhao et al. | 345/175 |
| 2011/0128140 A1 | 6/2011 | Pampus et al. | |
| 2011/0179368 A1 | 7/2011 | King et al. | |
| 2011/0248152 A1 | 10/2011 | Svajda et al. | |
| 2012/0062743 A1 | 3/2012 | Lynam et al. | |
| 2012/0128025 A1 | 5/2012 | Huppi et al. | |
| 2012/0206322 A1 | 8/2012 | Osterhout et al. | |
| 2012/0249477 A1 | 10/2012 | Popovich et al. | |
| 2013/0082978 A1 | 4/2013 | Horvitz et al. | |
| 2013/0093708 A1 | 4/2013 | Annett et al. | |
| 2013/0135472 A1 | 5/2013 | Wu et al. | |
| 2013/0214166 A1 | 8/2013 | Barlow et al. | |
| 2015/0034811 A1 | 2/2015 | David | |

FOREIGN PATENT DOCUMENTS

| | | |
|---|---|---|
| GB | 2 466 492 A | 6/2010 |
| WO | 03/093963 A2 | 11/2003 |
| WO | 03/100585 A2 | 12/2003 |
| WO | 2013060859 A1 | 5/2013 |

OTHER PUBLICATIONS

Office Action from U.S. Appl. No. 14/103,902, Dated Apr. 24, 2015, 14 pp.

International Search Report and Written Opinion from International Application No. PCT/US2014/054136, mailed Nov. 6, 2014, 11 pages.

U.S. Appl. No. 14/098,870, by Alameh, et al., filed Dec. 6, 2013.

U.S. Appl. No. 14/103,922, by Alameh, et al., filed Dec. 12, 2013.

U.S. Appl. No. 14/103,909, by Alameh, et al., filed Dec. 12, 2013.

Lego Mindstorms NXT PIR Sensor from HiTechnic, Lego Mindstorms, retrieved on Apr. 2, 2014 from www.generationrobots.com/en/401150-lego-mindstorms-nxt-pir-sensor-hitechnic.html, 3 pp.

Response to Office Action dated Nov. 17, 2014, from U.S. Appl. No. 14/103,922, filed Feb. 2, 2015, 11 pp.

Notice of Allowance from U.S. Appl. No. 14/103,922, dated Mar. 11, 2015, 8 pp.

Office Action from U.S. Appl. No. 14/098,870, dated Sep. 9, 2015, 21 pp.

Response to Office Action dated Sep. 9, 2015, from U.S. Appl. No. 14/098,870, filed Sep. 24, 2015, 6, 6 pp.

Notice of Allowance from U.S. Appl. No. 141098,870 mailed Nov. 2, 2015, 7 pp.

Final Office Action from U.S. Appl. No. 14/103,909, dated Oct. 22, 2015, 25 pp.

* cited by examiner

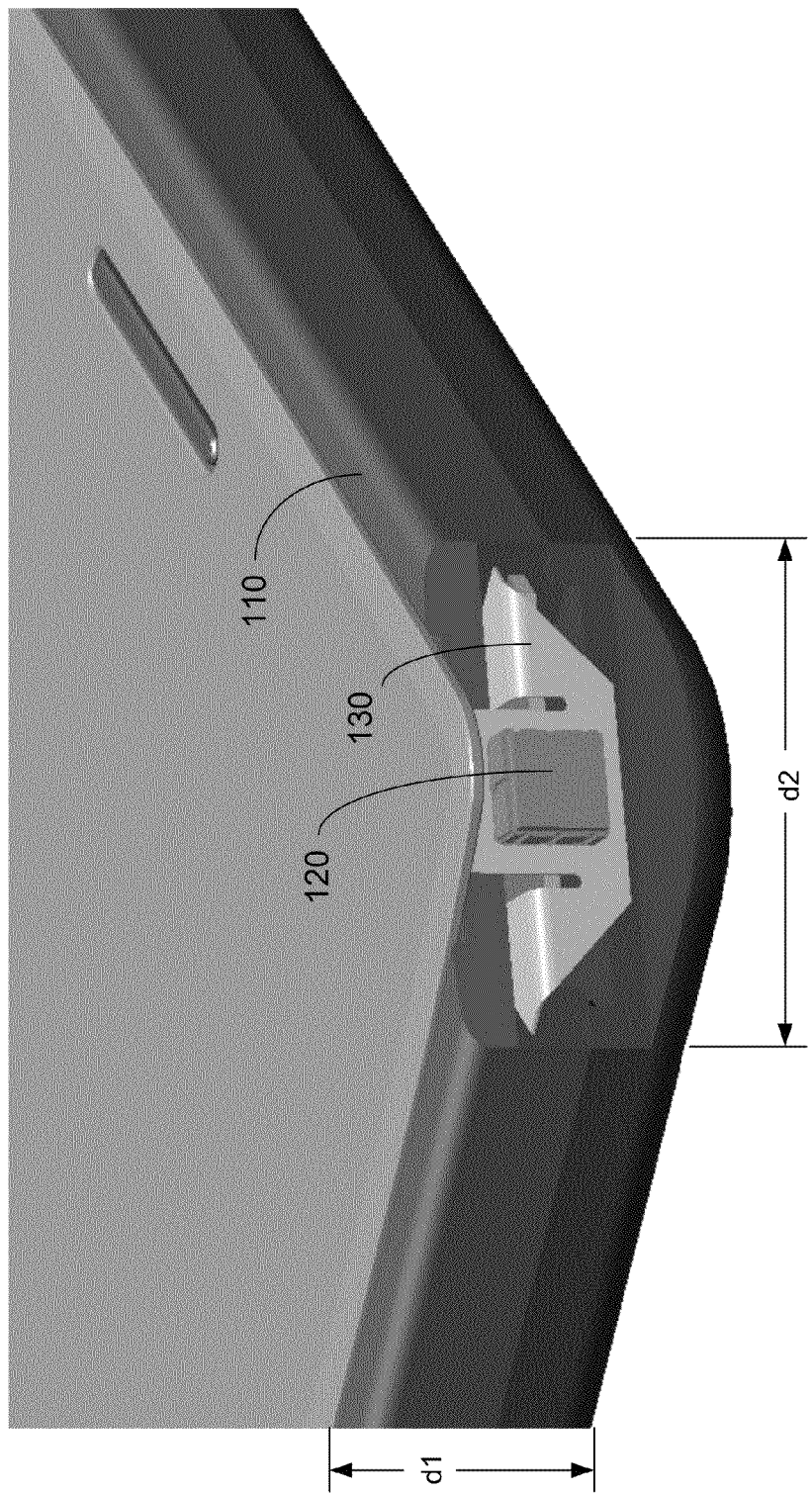

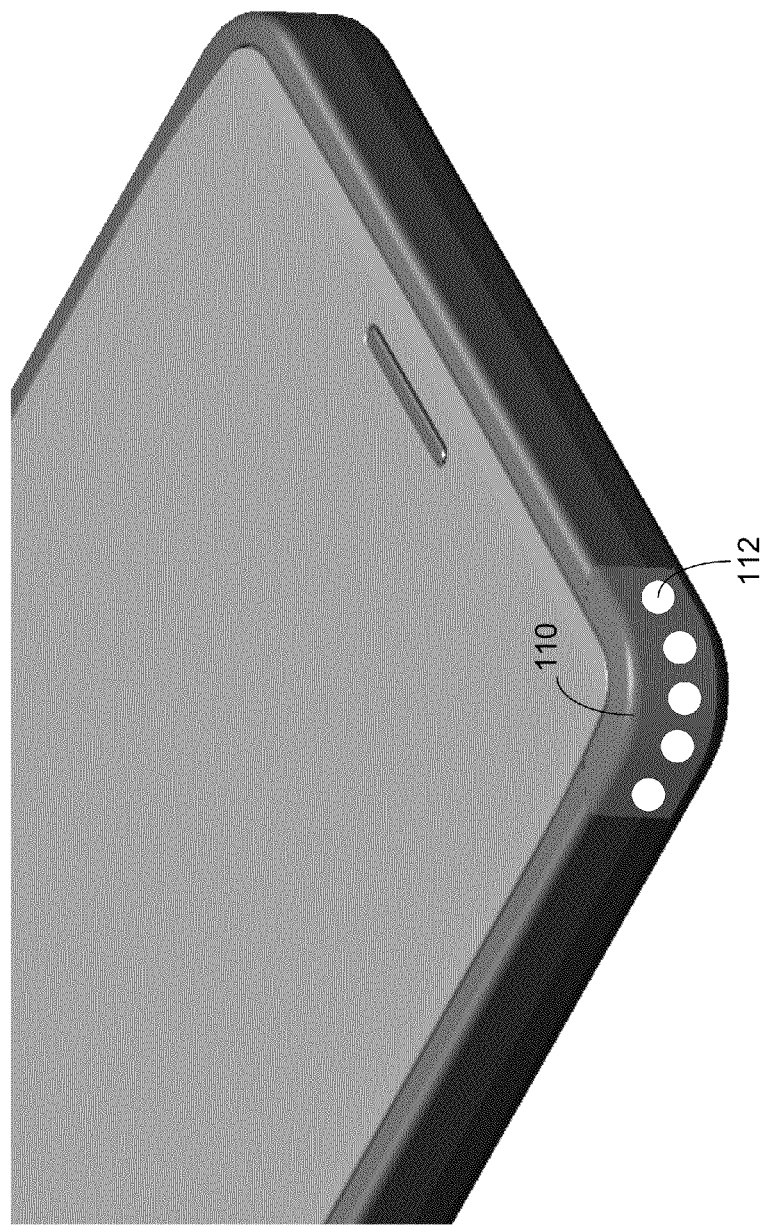

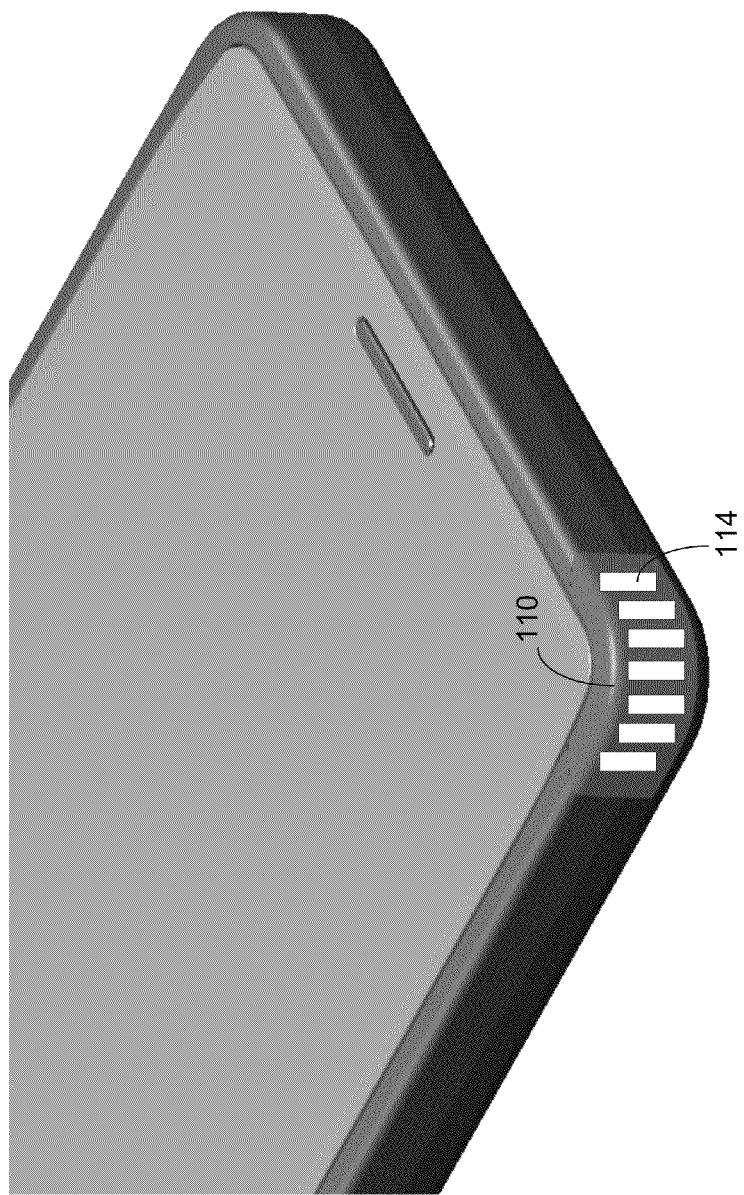

ELECTRONIC DEVICE AND METHOD FOR DETECTING PRESENCE AND MOTION

CROSS-REFERENCES TO RELATED APPLICATIONS

The present application claims the benefit of the filing date of U.S. Provisional Application No. 61/976,691, filed Sep. 11, 2013, the entire contents of which are incorporated by reference.

TECHNICAL FIELD

The present disclosure relates to electronic devices and methods for detecting presence and motion and, more particularly, to electronic devices and methods for detecting presence and motion using infrared sensors.

BACKGROUND

Mobile devices such as cellular telephones, smart phones, and other handheld or portable electronic devices such as personal digital assistants ("PDAs"), headsets, MP3 players, etc. have become popular and ubiquitous. As more and more features have been added to mobile devices, there has been an increasing desire to equip these mobile devices with input/output mechanisms that accommodate numerous user commands and/or react to numerous user behaviors. It is of increasing interest that mobile devices be capable of detecting the presence of, and determining with some accuracy the position of, physical objects located outside of the mobile devices and, more particularly, the presence and location of human beings (or portions of their bodies, such as their heads or hands) who are using the mobile devices or otherwise are located nearby the mobile devices. By virtue of such capabilities, the mobile devices are able to adjust their behavior in a variety of manners that are appropriate given the presence (or absence) and location of the human beings and/or other physical objects.

While remote sensing devices such as infrared (or, more accurately, near-infrared) transceivers have been employed in the past in some mobile devices to allow for the detection of the presence and/or location of human beings and/or physical objects even based on their movement, such sensing devices have been limited in various respects. In particular, some such near-infrared transceivers in some such mobile devices are only able to detect the movement of a human being/physical object within a certain distance from the given transceiver, but not able to detect the continuous presence of the human being/physical object after the human being/physical object stops moving or vice versa. Also, some such transceivers in some such mobile devices are undesirably complicated, require large numbers of components in order to operate, or require optical elements that attenuate the received infrared signals, which in turn renders such devices unduly expensive and inefficient.

DRAWINGS

While the appended claims set forth the features of the present techniques with particularity, these techniques may be best understood from the following detailed description taken in conjunction with the accompanying drawings of which:

FIG. 3 is a perspective view of an infrared sensor disposed in the electronic device of FIG. 1A or FIG. 1B.

FIG. 4A is a perspective view of a corner of the electronic devices of FIG. 1A or FIG. 1B, according to an embodiment.

FIG. 4B is a perspective view of a corner of the electronic devices of FIG. 1A or FIG. 1B, according to another embodiment.

DESCRIPTION

Figure 1A:
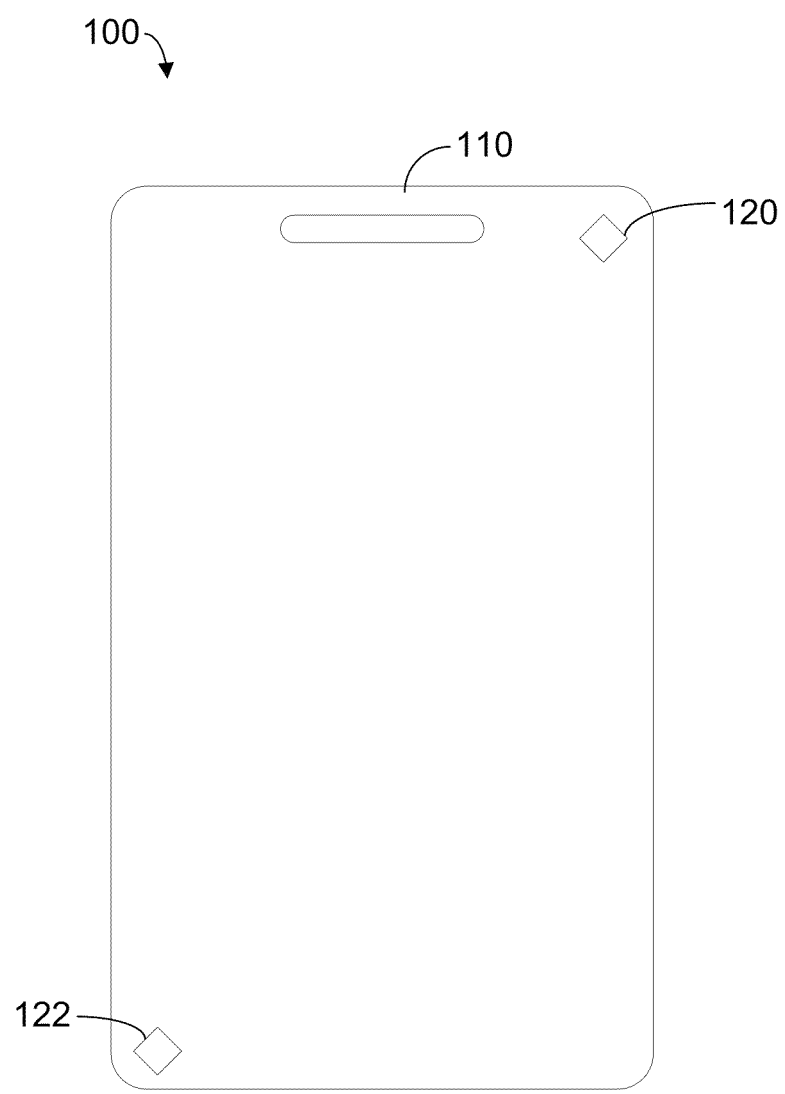
FIG. 1A is a top view of an electronic device, which is depicted as a mobile device in the drawing, according to an embodiment.

The present disclosure sets forth an electronic device for detecting presence and motion using infrared sensors.

In an embodiment, an electronic device includes a housing, a first infrared ("IR") sensor, and a second IR sensor. The housing includes a first corner having a first plurality of openings formed thereon and a second corner having a second plurality of openings formed thereon. The first IR sensor is disposed proximate to the first corner and has an unobstructed path and line of sight to outside of the electronic device via the first plurality of openings. The second IR sensor is disposed proximate to the second corner and has an unobstructed path and line of sight to outside of the electronic device via the second plurality of openings. The openings of the first plurality of openings are oriented toward the first IR sensor in different directions. The openings of the second plurality of openings are oriented toward the second IR sensor in different directions.

The housing of the device may further include a third corner having a third plurality of openings formed thereon and a fourth corner having a fourth plurality of openings formed thereon. The electronic device may further include a third IR sensor disposed proximate to the third corner and has an unobstructed path and line of sight to the outside of the electronic device via the third plurality of openings, and a fourth IR sensor disposed proximate to the fourth corner and has an unobstructed path and line of sight to the outside of the electronic device via the fourth plurality of openings. The openings of the third plurality of openings are oriented toward the third IR sensor in different directions. The openings of the fourth plurality of openings are oriented toward the fourth IR sensor in different directions.

For an electronic device having four IR sensors disposed in four corners, an angle of the total coverage of the first plurality of openings may be about 90 degrees. An angle of the total coverage of the second plurality of openings may be about 90 degrees. An angle of the total coverage of the third plurality of openings may be about 90 degrees. An angle of the total coverage of the fourth plurality of openings may be about 90 degrees. This is the total coverage angle enabled in each corner by the many openings in that location.

For an electronic device having two IR sensor disposed in two corners, an angle of the total coverage of the first plurality of openings may be about 180 degrees, and an angle of the total coverage of the second plurality of openings may be about 180 degrees. This is the total coverage angle enabled in each corner by the many openings in that location.

In yet another embodiment, an electronic device includes a housing, a first IR sensor, and a second IR sensor. The housing includes a top surface having a first corner and a second corner. A first opening is formed on the first corner, and a second opening is formed on the second corner. The first IR sensor is disposed proximate to the first corner and having an unobstructed path and line of sight to outside the housing via the first opening. The second IR sensor is disposed proximate to the second corner and having an unobstructed path and line of sight to outside of the housing via the second opening.

Each of the first IR sensor and the second IR sensor may be a thermopile sensor or a pyroelectric sensor. Each of the first IR sensor and the second IR sensor may be a thermopile sensor configured to detect emitted heat having a wavelength that ranges between about 5 to about 100 micrometer.

The first plurality of openings may include a first plurality of slits, and the second plurality of openings may include a second plurality of slits.

In an embodiment, at least two openings of the first plurality of openings may have sizes different from one another, and at least two openings of the second plurality of openings may have sizes different from one another.

In another embodiment, the first plurality of openings may include openings of the same size, and the second plurality of openings may include openings of the same size.

The first plurality of openings may include openings that are spaced evenly apart, and the second plurality of openings may include openings of that are spaced evenly apart.

The electronic device may further include a mesh material (e.g., speaker grille, mesh covering or filling) disposed in the housing that covers the first plurality of openings and the second plurality of openings.

The electronic device may also include a plastic film disposed outside of the housing and covers the first plurality of openings and the second plurality of openings, the plastic film may have a thickness of about 0.05 to 0.1 millimeters. The plastic film may be a super thin polyethylene film.

In an embodiment, when the first IR sensor detects heat emitted by a person received via at least one of the first plurality of openings, the first IR sensor generates a signal. The electronic device further includes a processor configured to detect presence of the person based on the generated signal. In other words, heat detection from a person via any of the openings indicates that the person is present.

In another embodiment, when the first IR sensor detects heat emitted by a person received via a first opening, the first IR sensor generates a first signal. When the first IR sensor detects heat emitted by the person received via a second opening, the first IR sensor generates a second signal. The processor is configured to determine motion of the person based a relative change of the first and second signals. To detect motion, the slits or openings may be separated by non-transparent material (opaque material at the wavelength of interest, e.g., about 10 micrometers), and modulate the heat signal reaching the IR sensor, which is then interpreted by the processor as an indication of motion.

The processor may be further configured to carry out a function in response to the first and second generated signals. The function to be carried out may include answering a call, dismissing a call, silencing a ringer, sending a call to voicemail, turning on a screen, waking up the electronic device, viewing the time, scrolling a screen, scrolling through photos, panning a map, alerting of messages, magnifying a view, switching audio mode, setting audio level, steering audio toward the person's location, steering camera toward the person's location, and altering device functionality based on distance between the person and the device.

In an embodiment, an electronic device includes a housing and an IR sensor. The housing includes a corner having a plurality of openings formed thereon, and the IR sensor is disposed proximate to the corner and has an unobstructed path and line of sight to outside of the housing via the plurality of openings. The IR sensor receives heat emitted by a person via at least one opening of the plurality of openings, and the device generates a signal in response thereto. The device then detects the presence of the person based on the generated signal.

If the presence of the person is detected, the device may initiate a notification. To initiate the notification, the device may display a notification on a display unit of the device, emit a notification sound from the device, or vibrate the device.

To detect the presence of the person, the device may determine a position of the person with respect to the electronic device based on the generated signal and may determine a distance between the person and the electronic device based on the generated signal level and change profile.

In an embodiment, based on the determined position or distance of the person, the device may adjust a notification volume. The device may control the adjusted notification volume so that it does not exceed an initial notification volume.

In another embodiment, based on the determined position or distance of the person, the device may change a type of notification based on the determined position or distance between the person and the device.

In still another embodiment, based on the determined position or distance of the person, the device may repeat the initiated notification.

The device may also detect motion of the person. When the IR sensor receives heat emitted by a person via a first opening, the device generates a first signal. When the IR sensor receives heat emitted by a person via a second opening, the device generates a second signal. The device then detects motion of the person based on a relative change of the generated first and second signals.

FIG. 1A is a top view of an electronic device 100, which is depicted as a mobile device in the drawing, according to an embodiment. The electronic device 100 includes a housing 110, a first IR sensor 120, and a second IR sensor 122. As shown, the first IR sensor 120 is disposed within the housing 110 and proximate to a first corner of the housing 110, and the second IR sensor 122 is disposed within the housing 110 and proximate to a second corner of the housing 110. The first corner and the second corner are disposed diagonally opposite of each other for the embodiment. In other embodiments, however, other arrangements are viable as well. As will discussed later with respect to FIGS. 4A and 4B, the first corner has a first plurality of openings formed thereon, and the second corner has a second plurality of openings formed thereon. Through the first plurality of openings, the first IR sensor 120 has an unobstructed path and line of sight to outside of the electronic device 100. Through the second plurality of openings, the second IR sensor 122 also has an unobstructed path and line of sight to outside of the electronic device 100. In other words, an optical element is not disposed between the first IR sensor 120 and the first plurality of openings or between the second IR sensor 122 and the second plurality of openings. Without the optical element, attenuation of any IR signal received by the first IR sensor 120 and the second IR sensor 122 is removed.

Figure 1B:
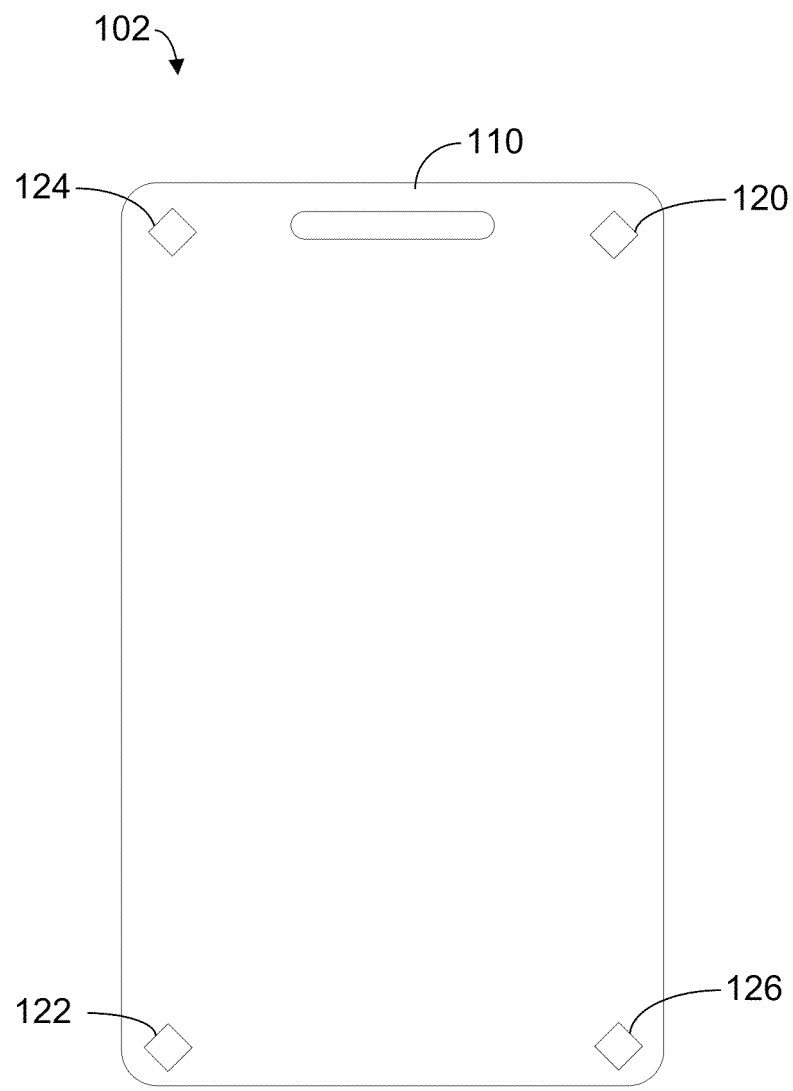
FIG. 1B is a top view of an electronic device, which is depicted as a mobile device in the drawing, according to another embodiment.

FIG. 1B is a top view of an electronic device 102, which is depicted as a mobile device in the drawing, according to another embodiment. The electronic device 102 has the same structure as the electronic device 100 of FIG. 1A, except that the electronic device 102 further includes a third IR sensor 124 and a fourth IR sensor 126. As shown in FIG. 1B, the electronic device 102 includes a housing 110 having four corners. Four IR sensors are disposed within the housing 110. The first IR sensor 120 is disposed proximate to the first corner, the second IR sensor 122 is disposed proximate to the second corner, the third IR sensor 124 is disposed proximate to the third corner, and the fourth IR sensor 126 is disposed proximate to the fourth corner. The first corner and the second corner are disposed diagonally opposite of each other, and the third and fourth corner are disposed diagonally opposite of each other. In other embodiments, other arrangements are viable as well.

As will discussed later with respect to FIGS. 4A and 4B, the first corner has a first plurality of openings formed thereon, the second corner has a second plurality of openings formed thereon, the third corner has a third plurality of openings formed thereon, and the fourth corner has a fourth plurality of openings formed thereon. Through the first plurality of openings, the first IR sensor 120 has an unobstructed path and line of sight to outside of the electronic device 102. Through the second plurality of openings, the second IR sensor 122 has an unobstructed path and line of sight to outside of the electronic device 102. Through the third plurality of openings, the third IR sensor 124 has an unobstructed path and line of sight to outside of the electronic device 102. Through the fourth plurality of openings, the fourth IR sensor 126 also has an unobstructed path and line of sight to outside of the electronic device 102. An optical element is not disposed between the first IR sensor 120 and the first plurality of openings, between the second IR sensor 124 and the second plurality of openings, between the third IR sensor 126 and the third plurality of openings, or the fourth IR sensor 126 and the fourth plurality of openings.

Figure 2:
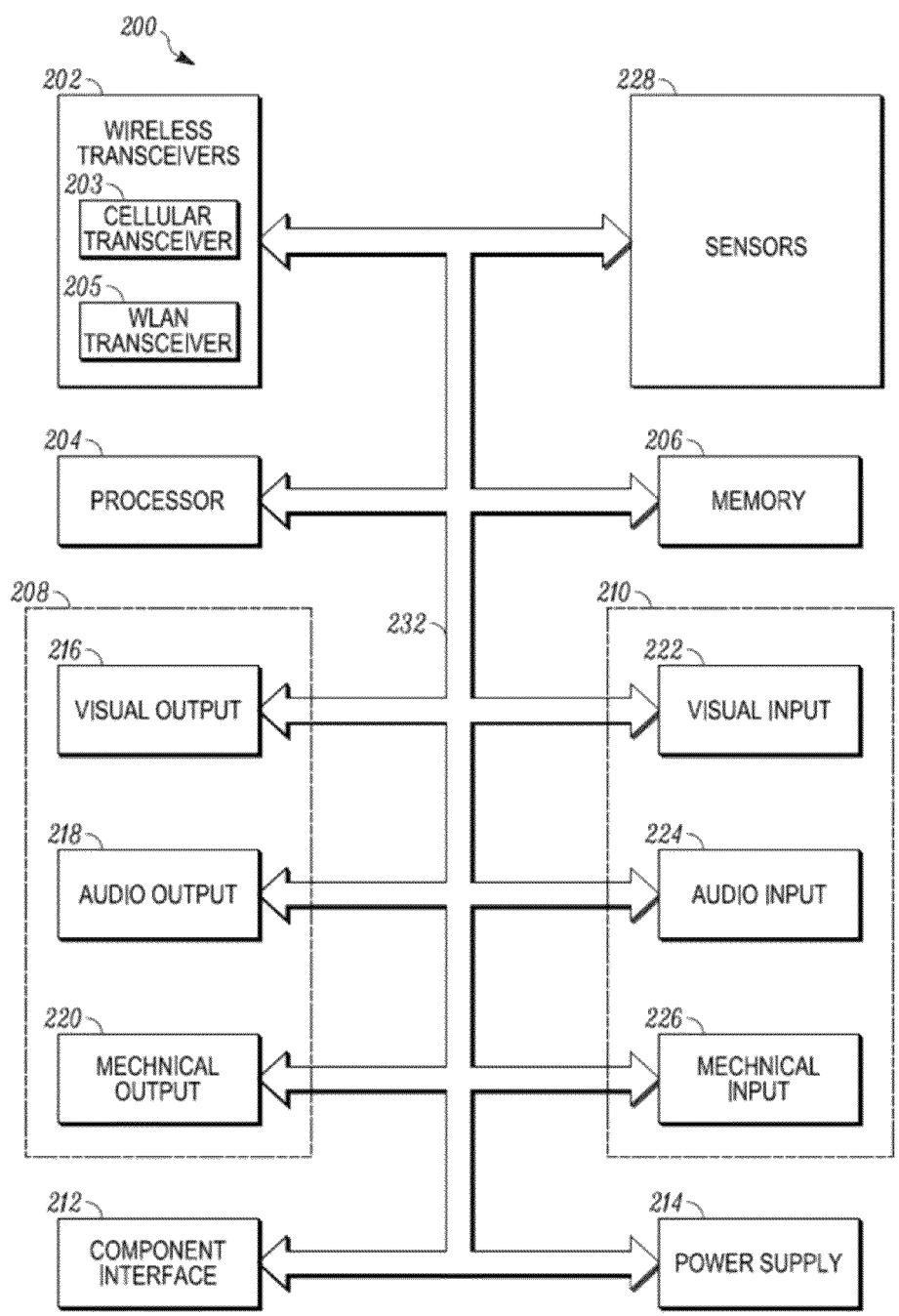
FIG. 2 shows example components of the electronic devices of FIGS. 1A and 1B.

FIG. 2 shows example components of the electronic devices (100, 102) of FIGS. 1A and 1B, in accordance with an embodiment of the disclosure. As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the device 100 or 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 100 or 102 is capable of communicating with any of a variety of other devices or systems (not shown) including, for example, other mobile devices, web servers, cell towers, access points, other remote devices, etc. Depending upon the embodiment or circumstance, wireless communication between the device 100 or 102 and any arbitrary number of other devices or systems can be achieved.

Operation of the wireless transceivers 202 in conjunction with others of the internal components 200 of the device 100 or 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 100 or 102. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 100 or 102 includes a touch screen display, the touch screen display can be considered to constitute both a visual output device and a mechanical input device (by contrast, keys or buttons are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 100 or 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 100 or 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 100 or 102 to perform a process such as the process for presence and/or motion detection as discussed below. Finally, with respect to informational data, this is non-executable code or information that can be referenced and/or manipulated by an operating system or program for performing functions of the device 100 or 102.

FIG. 3 is a perspective view of the first IR sensor 120 disposed in the electronic devices 100 and 102 of FIG. 1A and FIG. 1B. Although the first IR sensor 120 is shown, the same sensor assembly may be adapted for the second IR sensor 122 of the device 100 of FIG. 1A. Similarly, the same sensor assembly may be adapted for each of the second IR sensor 122, the third IR sensor 124, and the fourth IR sensor 126 of the device 102 of FIG. 1B. In other words, the first IR sensor 120 and its assembly are representative of the other IR sensors and their assemblies.

The first corner of the housing 110 is shown in FIG. 3. The first IR sensor 120 is disposed within the housing 110 and proximate to the first corner. The first IR sensor 120 is connected to a flexible circuit 130 (e.g., flexible printed circuit board), which enables communication between the first IR sensor 120 and a processor in the electronic device 100 (e.g., the processor 204 of FIG. 2). The first IR sensor 120 is an IR receiver, and the sensor assembly as shown in FIG. 3 does not include an IR transmitter. In the present disclosure, the IR transmitter is a person near the device, who may emit body heat or IR signal having a wavelength of about 10 microns. To detect the heat emitted by the person, the first IR sensor 120 may be a passive heat sensor (e.g., a thermopile sensor), or a heat motion sensor (e.g., a pyroelectric sensor), or other passive heat sensor known in the art.

In an embodiment, the first IR sensor 120 is a thermopile sensor configured to detect emitted heat or IR signals having a wavelength that ranges between about 5 microns to 100 microns. This embodiment would delineate between heat emitted by a person from heat emitted by other objects, e.g., other electronic devices.

As shown in FIG. 3, the placement of the first IR sensor 120 (and likewise other IR sensors) should be such that the housing 110 does not restrict the coverage of the first IR sensor 120 or prevents heat emitted by a person from reaching first IR sensor 120. In the present embodiment, the thickness d1 of the housing 110 may be about 8 millimeters to 10 millimeters, and the length d2 of the corner may be about 13 millimeters to 18 millimeters. In other embodiments, however, the thickness d1 of the housing 110 and the length d2 of the corner may be vary based on the dimensions of the device. As shown in FIGS. 4A and 4B, the dimensions and pointing directions of the openings or slits set the detection coverage area of the first IR sensor 120, which will be discussed with respect to FIGS. 5A to 5C.

FIG. 4A is a perspective view of the first corner of the electronic devices 100 and 102 of FIG. 1A and FIG. 1B, according to an embodiment. In particular, FIG. 4A illustrates the first plurality of openings 112 formed on the first corner of the housing 110. The first plurality of openings 112 may be representative of the other plurality of openings formed on the other corners of the housing 110.

As shown in FIG. 4A, the first plurality of openings 112 is formed along the first corner of the housing 110. Each opening of the first plurality of openings 112 has a substantially circular shape. In other embodiments, however, the openings of the first plurality of openings 112 may have an oval or oblong shape, rectangular shape, triangular shape, a grille or mesh material having tiny holes embedded within each opening, etc. Through the first plurality of openings 112, the first IR sensor 120 (as shown in FIG. 3) has an unobstructed path and line of sight to outside of the electronic device 100 or 102. For example, when a person approaches the device 100 or 102, the body heat emitted by the person is transmitted through the first plurality of openings 112 and then detected by the first IR sensor 120.

FIG. 4B is a perspective view of the first corner of the electronic devices 100 and 102 of FIG. 1A and FIG. 1B, according to another embodiment. In FIG. 4B, the first plurality of openings 114 is formed along the first corner of the housing 110. Each opening of the first plurality of openings has a slit shape. Like the embodiment shown in FIG. 4A, when a person approaches the device 100 or 102, the body heat emitted by the person is transmitted through the first plurality of openings 114 and then detected by the first IR sensor 120. The first plurality of openings 114 may be representative of the other plurality of openings formed on the other corners of the housing 110.

Although the openings in FIGS. 4A and 4B are shown to have the same size, in another embodiment, at least two openings of the first plurality of openings may have sizes different from one another, and at least two openings of the second plurality of openings may have sizes different from one another. In yet another embodiment, the first plurality of openings may include openings that are spaced evenly apart, and the second plurality of openings may include openings of that are spaced evenly apart. In still another embodiment, the spacing between two of the plurality of openings may be different from the spacing of another two of the plurality of openings (e.g., the spacing between the first opening and the second opening may be different from the spacing between the second opening and the third opening).

In addition, each opening or slit of the plurality of openings points or orients in a different direction toward the IR sensor 120. When the openings are oriented toward the IR sensor 120 in different directions, the device 100 and 102 detect both presence and motion of a person. For example, a person standing near the device 100 may trigger the first IR sensor 120 via a first opening. When that person moves to a different angle, communication (or heat reception) via the first opening is no longer possible and communication via a new slit that is lined up with the person and the first IR sensor 120 takes place. In a way, the openings act as directional filters.

Figure 5A:
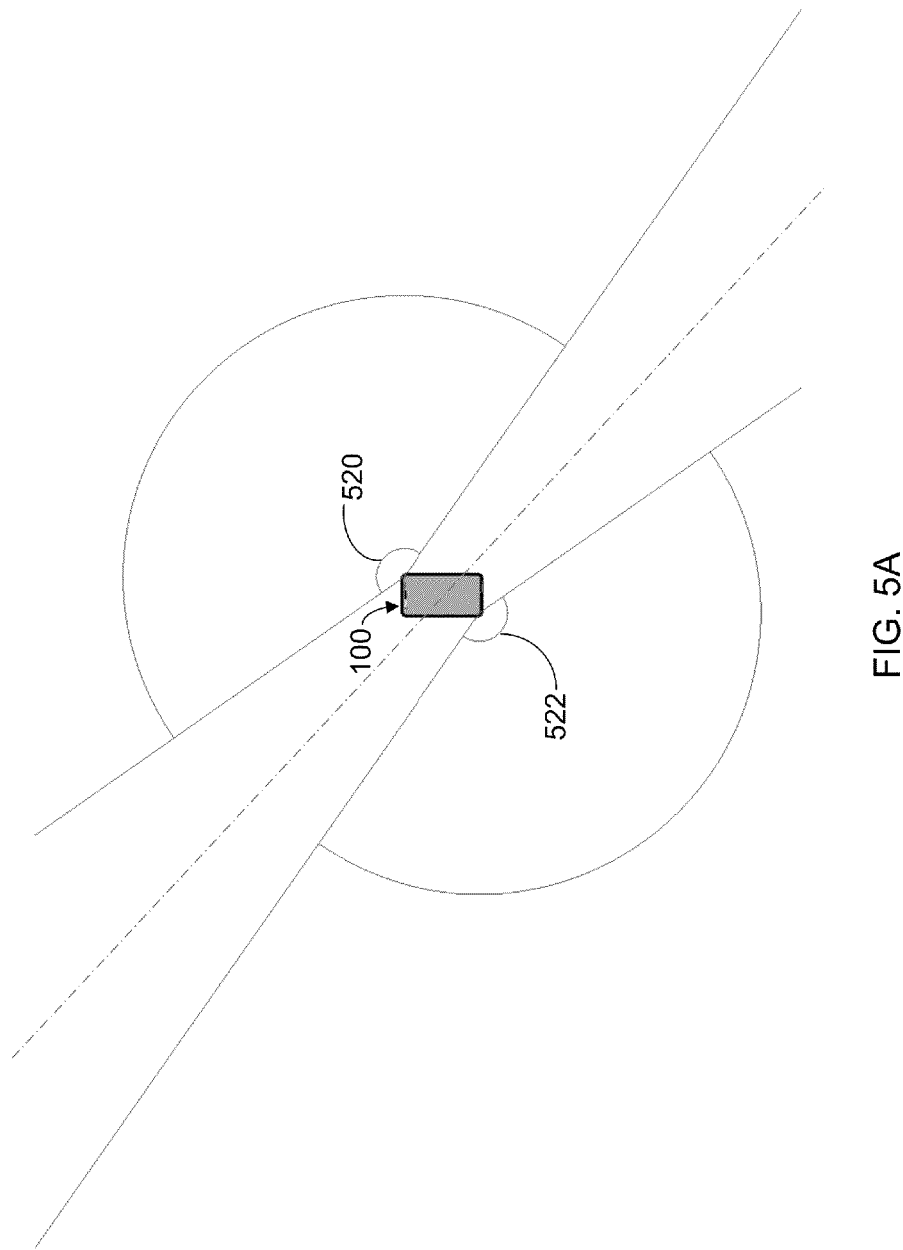
FIGS. 5A-5E show detection coverage areas of the electronic devices of FIGS. 1A and 1B.

FIGS. 5A-5E show detection coverage areas of the electronic device 100 of FIG. 1A. As discussed above with respect to FIG. 1A, the electronic device 100 includes the first IR sensor 102 and the second IR sensor 122. FIG. 5A illustrates the horizontal-plane detection coverage area of each of the first IR sensor 120 and the second IR sensor 122 via the first plurality of openings and the second plurality of openings, respectively. The first IR sensor 120 has a first coverage area, which is represented by a first angle 520 formed by the first plurality of openings formed on the first corner. The second IR sensor 122 has a second coverage area, which is represented by a second angle 522 formed by the second plurality of openings formed on the second corner.

Figure 5B:
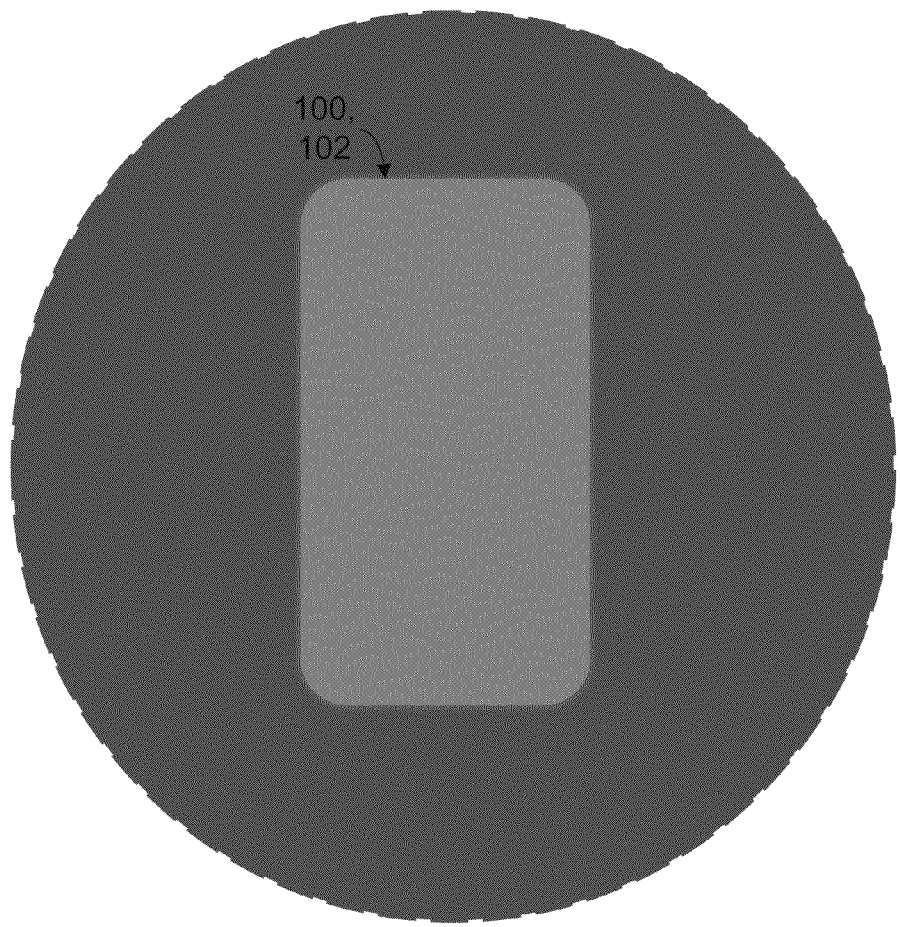

FIG. 5B illustrates an ideal horizontal-plane detection coverage area of the electronic devices 100 and 102 of FIGS. 1A and 1B. The ideal detection coverage area is 360 degrees around the perimeter of the device 100 or 102 in the horizontal-plane. With this coverage area, presence or movement of a person in any direction with respect to the device 100 or 102 may be detected by the device 100 or 102. Accordingly, in order for the electronic device 100 to achieve as close to the 360 degrees coverage area as possible, each of the first angle 520 and the second angle 522 (as shown in FIG. 5A) may range between about 90 degrees to about 180 degrees. In an embodiment, each of the first angle 520 and the second angle 522 may be as close to 180 as possible. For example, each of the first angle 520 and the second angle 522 may be about 160 degrees.

On the other hand, in order for the electronic device 102 of FIG. 1B—which includes four IR sensors disposed proximate to each corner of the housing 110—to achieve as close to the 360 degrees coverage are as possible, the angle of each plurality of openings may be about 90 degrees. The angle of the electronic device 102 may be smaller than the angle of the electronic device 100 because the additional two IR sensors reduce the coverage area of each IR sensor. In other words, each IR sensor of the device 100 must cover a greater area than each IR sensor of the device 102.

Figure 5C:
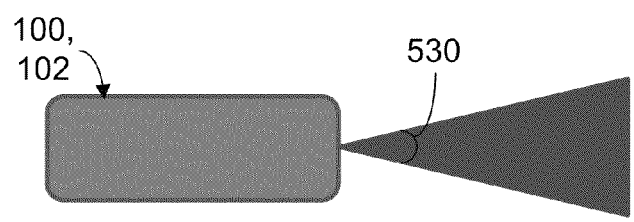

FIG. 5C illustrates the elevation detection coverage area of the electronic devices 100 and 102 of FIGS. 1A and 1B. The elevation detection coverage are of the first IR sensor 120 is represented by an elevation angle 530. The elevation angle 530 is subject to the design of the openings or slits and may have a smaller angle that is acceptable. For example, the elevation angle 530 may be about 30 degrees to detect a person walking by a table. Thus, in three-dimensional space, the detection coverage area of each IR sensor of the electronic devices 100 and 102 forms a substantially conical shape.

Figure 5D:
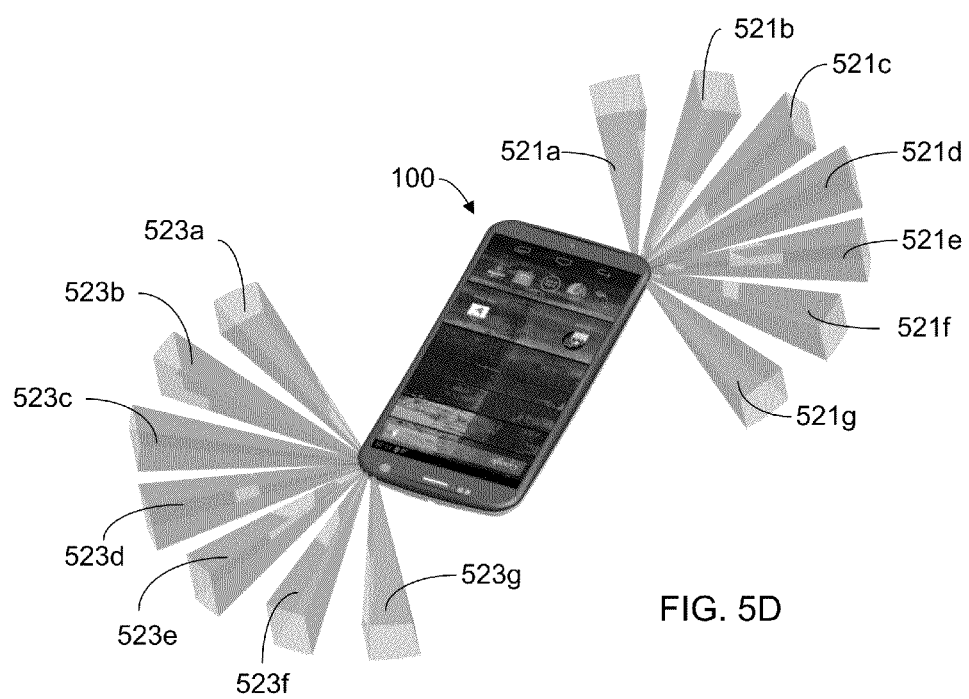
Figure 5E:
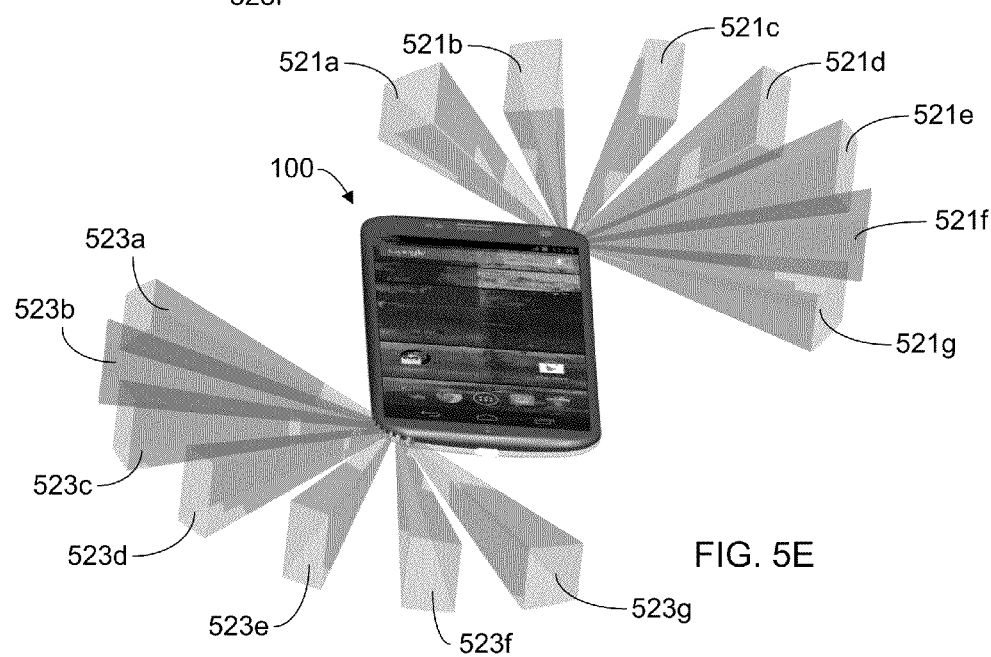

FIGS. 5D and 5E illustrate the detection coverage of each opening of the electronic device 100 of FIG. 1A. As shown in FIGS. 5D and 5D, each corner of the device 100 includes seven openings or slits. The first coverage area (represented by the first angle 520 as shown in FIG. 5A) includes the coverage area of each opening, 521*a*, 521*b*, 521*c*, 521*d*, 521*e*, 521*f*, and 521*g*. The second coverage area (represented by the second angle 522 as shown in FIG. 5A) includes the coverage area of each opening, 523*a*, 523*b*, 523*c*, 523*d*, 523*e*, 523*f*, and 523*g*.

Each of the first coverage area and the second coverage area represents the total coverage area of the respective corner. The total coverage area is the collective coverage area via all the openings or slits in that corner or group. Each opening or slit only covers a small segment or portion of the total coverage area. For example, if a corner has six openings, each opening would cover about 30 degrees of a total coverage area of about 180 degree in that corner. As shown in FIGS. 5D and 5E, each opening or slit points toward the IR sensor in a different direction, thus allowing coupling between the IR sensor and a person for one position. It is possible that one position of the person can cause more than one opening or slit to line up between the person's body and IR sensor. If a person is near the device or if the user's body is large, the user's presence may be detected using many openings or slits disposed in the corner of the device.

Figure 6:
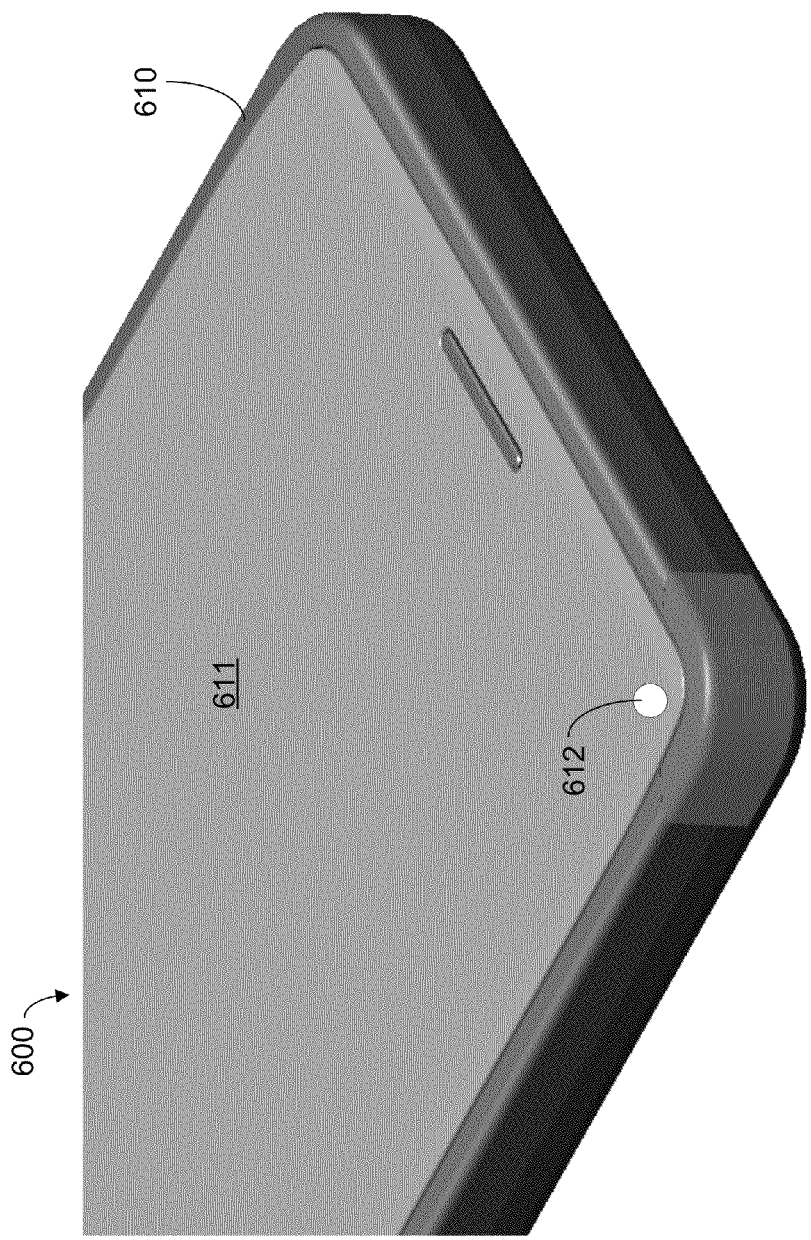
FIG. 6 is a perspective view of a corner of an electronic device, according to yet another embodiment.

FIG. 6 is a perspective view of a first corner of an electronic device 600, according to yet another embodiment. The electronic device 600 includes a housing 610, and a first IR sensor and a second IR sensor (not shown). The housing 610 includes a top surface 611 having a first corner and a second corner. A first opening 612 is formed on the first corner of the top surface 611. A second opening is formed on the second corner of the top surface 611. The first IR sensor is disposed proximate to the first corner and has an unobstructed path and line of sight to outside the housing 610 via the first opening 612. The second IR sensor is disposed proximate to the second corner and has an unobstructed path and line of sight to outside of the housing 610 via the second opening.

The first IR sensor and the second IR sensor are disposed within the housing 610. Because the first opening 612 is disposed on the top surface 611, the first IR sensor is oriented toward the top surface 611. Similarly, the second IR sensor is oriented toward the top surface 611 and the second opening formed thereon. In this embodiment, based on the location of the first and second openings and the orientation of the IR sensors, the detection coverage area of the IR sensors would be an area above the top surface 611 (e.g., in the z-axis direction). Thus, the device 600 may be used to perform the IR proximity function, where the device 600 turns off a touch screen of the device 600 when a person's face approaches the top surface 611.

Figures 6, 7:
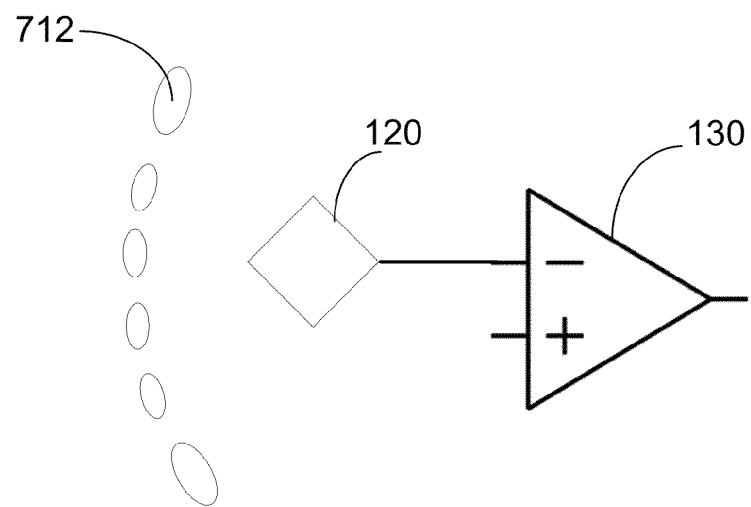
FIG. 7 shows a configuration of a presence and motion detection system of the electronic devices of FIGS. 1A and 1B.

FIG. 7 shows a configuration of a presence and motion detection system of an electronic device. The presence and motion detection system includes a thermopile sensor (e.g., first IR sensor 120) with motion modulating variable-size openings (e.g., the plurality of openings 112, 114, holes or slits) designed into the housing of the electronic device. The openings may be protected by a speaker grille or another mesh material from inside of the housing.

In another embodiment, a plastic film covering the openings may be disposed outside the housing to prevent dust or water from entering the device. The plastic film may be a super thin polyethylene film, which is a material that passes wavelengths of body heat. The thin plastic film may have a thickness of about 0.05 or about 0.1 millimeters. The thin plastic film seals device and relies on the structure of the openings for strength.

In particular, FIG. 7 illustrates the first IR sensor 120, the circuit 130, and a plurality of openings 712. The first IR sensor 120 is connected to the circuit 130, which enables communication between the first IR sensor 120 and the processor in the electronic device (e.g., the processor 204 of FIG. 2). The first IR sensor 120 has an unobstructed path and line of sight to outside of the device via the plurality of openings 712. The plurality of openings 712 is shown to have openings of variable sizes.

To detect the presence of a person near the device, the first IR sensor 120 detects the heat (IR signal) emitted by the person via any opening or openings of the plurality of openings 712. The circuit 130 (e.g., an application-specific integrated circuit) converts the received IR signal into an electric signal (e.g., the circuit 130 may generate a voltage based on the received IR signal). The processor then performs an analysis of the electric signal to determine the presence of the person. The device detects the presence of the person when heat emitted by the person is received by the first IR sensor 120.

To detect motion of the person, the processor analyzes the changing (modulated) heat reception via the openings or slots as the person walks or moves near device. As discussed above, these openings or slots are pointed or oriented toward the IR sensor in different directions. When a person starts at position one, a first opening or slot is lined up with the person and IR sensor active area, and thus allows heat emitted by the person to shine on the IR sensor active area. As the person walks near device, that first opening or slot is no longer lined up with person and the IR sensor active area. Instead, a different, second opening or slot is lined up with the person's new position. The second opening or slot allows heat emitted by the person to reach the IR sensor active area, after a gap caused by the opaque surface between the first and second openings or slots. This process results in heat modulation as the heat path between person and IR sensor changes via the many openings or slots.

Referring to FIG. 7, to detect the motion of the person (e.g., the person is approaching or moving around the device), the plurality of openings 712 modulates the heat (IR signal) emitted by the person that is received by the first IR sensor 120. When the first IR sensor 120 detects heat emitted by the person received via one of the first plurality of openings 712 (e.g., a first opening), the first IR sensor 120 may generate a first signal. When the first IR sensor 120 detects heat emitted by the person received via at another of the first plurality of openings 712 (e.g., a second opening), the first IR sensor 120 may generate a second signal. The processor then analyzes the first and second signals to determine whether the person is in motion. The processor detects the movement of the person based on a relative change of the first and second signal. For instance, when the person is moving about the device, the IR signals received via each of the plurality of openings may vary. The variance between the received IR signals thus indicates the motion of the person.

Accordingly, to detect presence, the IR sensor only needs to receive heat through any opening or a combination of the openings. To detect motion, the received heat signal is analyzed to detect filter modulation. Modulation is the result of heat passing through one opening and then switching to another opening, then another and then another. That is akin to an AC signal. In an embodiment, a high pass filter may be used, which filters out signals representing presence and passes the signals representing motion.

Figure 8:
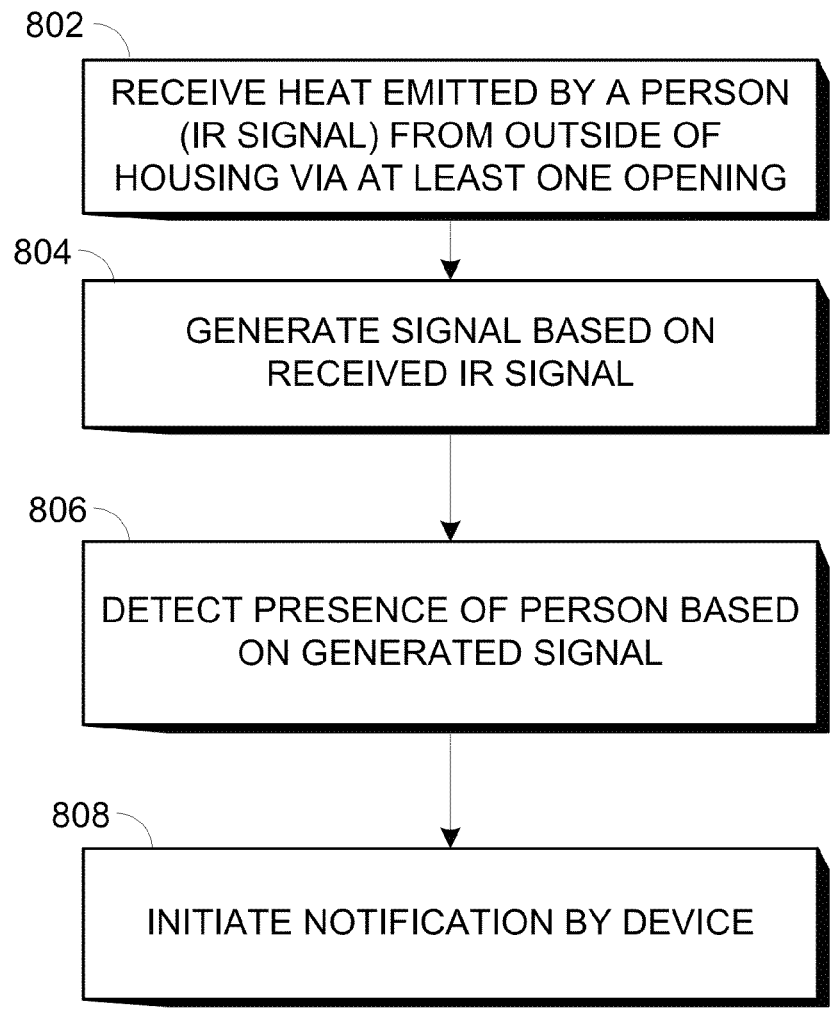
FIGS. 8-10 show steps that may be carried out according to various embodiments.

FIG. 8 illustrates a procedure 800 that may be carried out by an electronic device, according to an embodiment. At step 802, at least one IR sensor of the device receives heat (IR signal) emitted by a person from outside of the device via at least one opening of a plurality of openings. Based the received IR signal, the processor of the device generates a signal at step 804. Using the generated signal, the device detects the presence of the person.

At step 806, the device detects presence of the person based on the generated signal. When the IR sensor detects heat emitted by the person from any of the openings, the device recognizes that that person is present, regardless of whether the person is moving. Next, at step 810, the processor of the device may carry out a function in response to the detection of the person's presence, such as initiating a notification. To initiate the notification, the device may display a notification on a display unit of the device, emit a notification sound from the device, or vibrate the device.

The processor of the device may carry out other functions when it determines that the person is present. These functions may include answering a call, dismissing a call, silencing a ringer, sending a call to voicemail, turning on a screen, waking up the electronic device, viewing the time, scrolling a screen, scrolling through photos, panning a map, alerting of messages, magnifying a view, switching audio mode, setting audio level, steering audio toward the person's location, steering camera toward the person's location, and altering device functionality based on distance between the person and the device.

Figure 9:
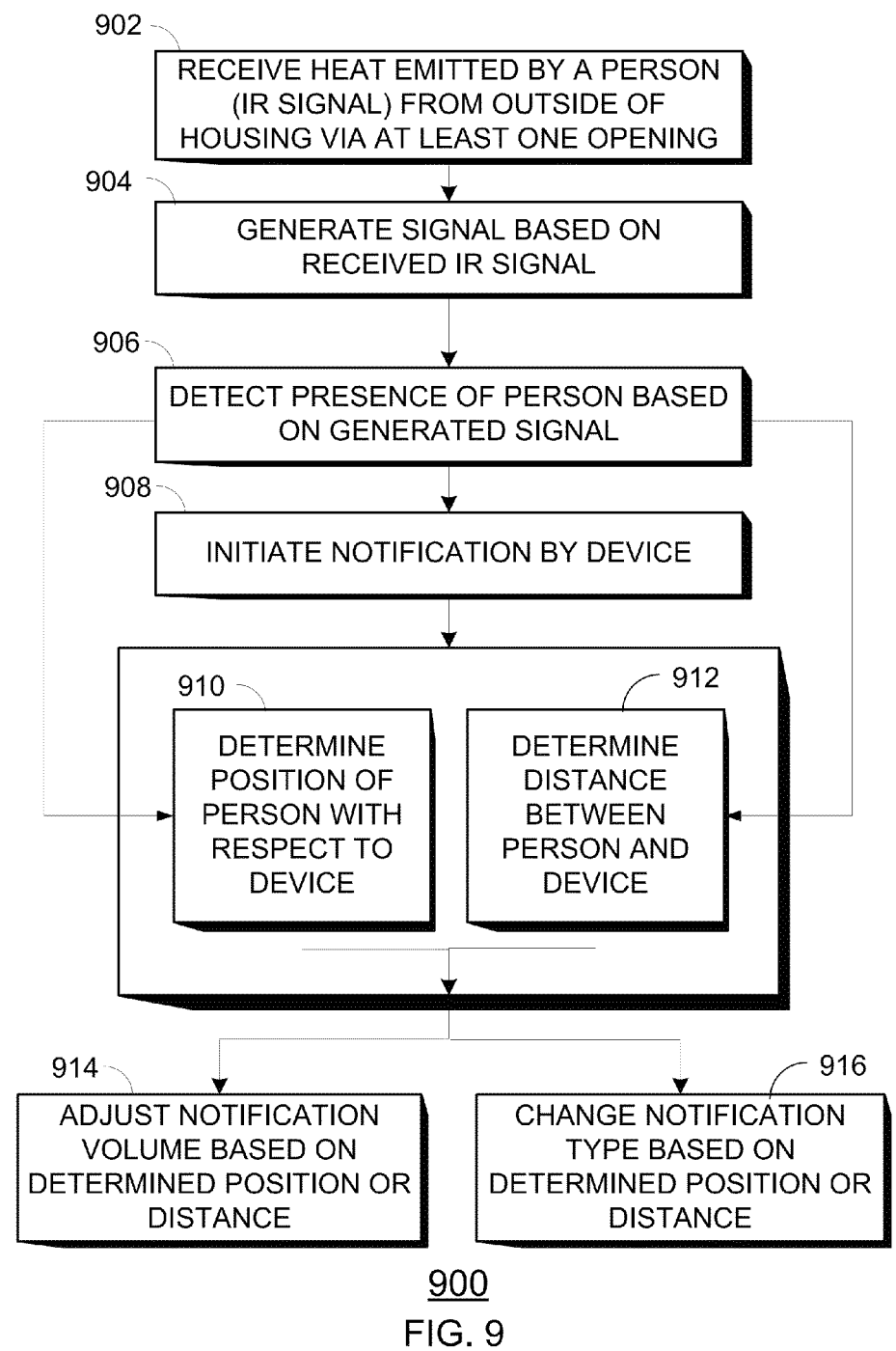

FIG. 9 illustrates a procedure 900 that may be carried out by an electronic device, according to another embodiment. At step 902, at least one IR sensor of the device receives heat (IR signal) emitted by a person from outside the housing of the device via at least one opening of a plurality of openings. Based the received IR signal, the processor of the device generates a signal at step 904. Using the generated signal, the device detects the presence of the person at step 906. If the presence or motion of the person is detected, the device may initiate a notification at step 908.

Furthermore, when detecting the presence of the person at step 906, the device may determine the position/location of the person with respect to the device. At step 910, the device may determine the position or direction of the person with respect to the device. Using the direction or position information, the device may orient the display screen so that the screen is easily readable by the user (e.g., orient the display screen so text or other display elements are displayed right-side up). At step 912, the device may determine the distance and/or change in the distance between the person and the device.

If the initiated notification at step 908 is an emission of notification sound, then at step 914, based on the determined position or distance of the person with respect to the device, the device may adjust the notification sound volume. As the person approaches the device (i.e., the distance decreases), the device may control the adjusted notification volume so that it does not exceed an initial notification volume.

Optionally, at step 916, based on the determined position or distance of the person with respect to the device, the device may change a type of notification based on the determined position or distance between the person and the device. For instance, the device may emit a notification sound when the person is first detected. When the person is within a predetermined distance of the device (e.g., the person is close enough to the device to see/read the display screen), the device may stop emitting the notification sound and change the notification to a display notification.

In other embodiments, based on the determined position or distance of the person with respect to the device, the device may repeat the initiated notification.

Figure 10:
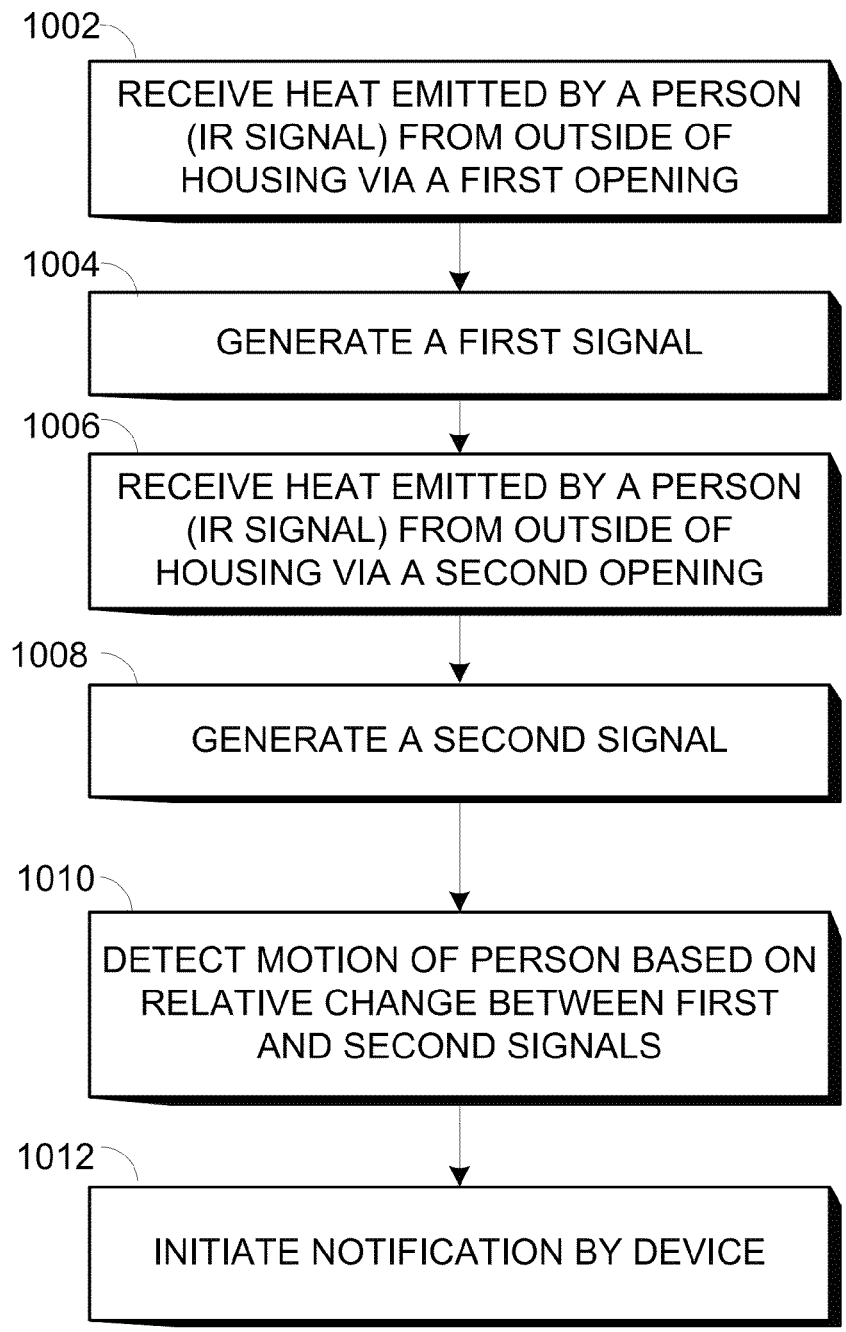

FIG. 10 illustrates a procedure 1000 that may be carried out by an electronic device, according to another embodiment. The procedure 1000 illustrates a process for detecting motion of a person by the electronic device. At step 1002, at least one IR sensor of the device receives heat (IR signal) emitted by a person from outside the housing via a first opening of a plurality of openings. Based the received IR signal, the processor of the device generates a first signal at step 1004. After the person moves, at step 1006, the IR sensor receives heat (IR signal) emitted by the person from outside the housing via a second opening. Based on the received IR signal, the processor generates a second signal at step 1008. Using the relative changes of the generated first and second signals (which together forms a modulated signal), the device detects the motion of the person at step 1010. If the motion of the person is detected, the device may initiate a notification at step 1012.

Figure 11:
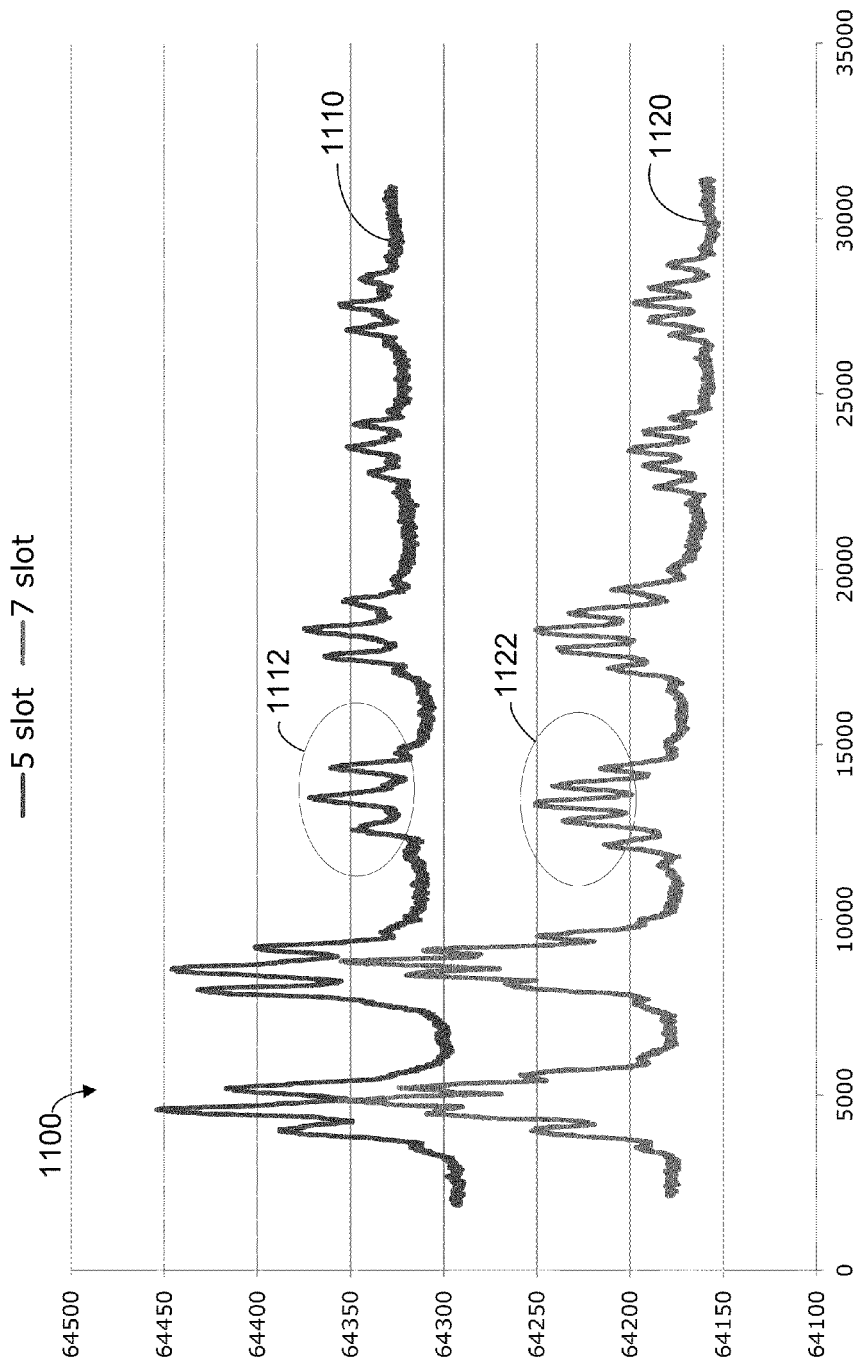
FIG. 11 show data collected using an electronic device, according to various embodiments.

FIG. 11 shows data collected using an electronic device when a person is moving away from the device, according to various embodiments. The collected data are shown in a graph 1100, in which the x-axis represents time and the y-axis represents amplitude of the IR signals received by the electronic device. Data from two embodiments are shown. The modulated signal waveform 1110 corresponds to data collected from a device having five slots formed on a corner of the device. The modulated signal waveform 1120 corresponds to data collected from a device having seven slots formed on a corner of the device.

As shown in FIG. 11, each peak in the waveform 1110 and the waveform 1120 corresponds to the signal received via each slot. One peak in the waveform 1110 or the waveform 1120 would indicate the detection of a person's presence. As the person moves, the person is lined up with a first slot, then a second slot, then a third slot, etc, which results in a first peak, then a second peak, then a third peak, etc. The peak group 1112 in the waveform 1110 and the peak group 1122 in the waveform 1120 thus indicate the motion of the person. Furthermore, when the person is near the device, the heat received by the IR sensor is stronger, thus resulting in a higher amplitude in the waveforms 1110 and 1120. As the person moves away from the device, the heat received by the IR sensor is weaker, thus resulting in a lower amplitude in the waveforms 1110 and 1120.

In an embodiment, one or more input devices (e.g., a camera, an imaging device, or a microphone) may be disposed proximate or near each of the IR sensors. When an IR sensor detects the presence of a person, the corresponding input device of the IR sensor, which is oriented toward the direction of the person's presence and approach, is turned on. Similarly, if more than one IR sensors detect the presence of the person, the corresponding input devices of the IR sensors, which are oriented toward the direction of the person's presence and approach, are turned on. In other words, the IR sensors act as direction triggers for activating their corresponding input devices.

It can be seen from the foregoing that an electronic device and methods for detecting presence and motion using IR sensors have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. An electronic device comprising:
a housing comprising:
a first corner having a first plurality of openings formed thereon;
a second corner, diagonally opposite the first corner, having a second plurality of openings formed thereon;
a third corner; and
a fourth corner, diagonally opposite the third corner;
a first infrared ("IR") sensor proximate to the first corner and having an unobstructed path and line of sight to outside of the electronic device via the first plurality of openings;
a second IR sensor proximate to the second corner and having an unobstructed path and line of sight to outside of the electronic device via the second plurality of openings;
wherein the first plurality of openings are oriented toward the first IR sensor in different directions; and
wherein the second plurality of openings are oriented toward the second IR sensor in different directions.

2. The electronic device of claim 1, wherein:
the third corner includes a third plurality of openings formed thereon;
the fourth corner includes a fourth plurality of openings formed thereon;
the electronic device further comprises:
a third IR sensor proximate to the third corner and having an unobstructed path and line of sight to the outside of the electronic device via the third plurality of openings; and
a fourth IR sensor proximate to the fourth corner and having an unobstructed path and line of sight to the outside of the electronic device via the fourth plurality of openings;
the third plurality of openings are oriented toward the third IR sensor in different directions; and
the fourth plurality of openings are oriented toward the fourth IR sensor in different directions.

3. The electronic device of claim 2, wherein:
an angle of the total coverage of the first plurality of openings is about 90 degrees;
an angle of the total coverage of the second plurality of opening is about 90 degrees;

an angle of the total coverage of the third plurality of openings is about 90 degrees; and an angle of the total coverage of the fourth plurality of openings is about 90 degrees.

4. The electronic device of claim 1, wherein:
an angle of the total coverage of the first plurality of openings is about 180 degrees; and
an angle of the total coverage of the second plurality of openings is about 180 degrees.

5. The electronic device of claim 1, wherein each of the first IR sensor and the second IR sensor is selected from the group consisting of a thermopile sensor and a pyroelectric sensor.

6. The electronic device of claim 1, wherein each of the first IR sensor and the second IR sensor comprises a thermopile sensor configured to detect emitted heat having a wavelength that ranges between about 5 to about 100 micrometers.

7. The electronic device of claim 1, wherein:
the first plurality of openings comprises a first plurality of slits; and
second plurality of openings comprises a second plurality of slits.

8. The electronic device of claim 1, wherein:
at least two openings of the first plurality of openings have sizes different from one another; and
at least two openings of the second plurality of openings have sizes different from one another.

9. The electronic device of claim 1, wherein:
the first plurality of openings comprises openings of the same size; and
the second plurality of openings comprises openings of the same size.

10. The electronic device of claim 1, wherein:
the first plurality of openings comprises openings that are spaced evenly apart; and
the second plurality of openings comprises openings of that are spaced evenly apart.

11. The electronic device of claim 1, further comprising a mesh material disposed in the housing that covers the first plurality of openings and the second plurality of openings.

12. The electronic device of claim 1, further comprising a plastic film disposed outside of the housing and covers the first plurality of openings and the second plurality of openings, the plastic film having a thickness of about 0.05 to 0.1 millimeters.

13. The electronic device of claim 1, wherein:
when the first IR sensor detects heat emitted by a person received via at least one opening of the first plurality of openings, the first IR sensor generates a signal; and
the electronic device further comprises a processor configured to detect presence of the person based on the generated signal.

14. The electronic device of claim 13, wherein:
the processor is further configured to carry out a function in response to the first generated signal; and
the function is selected from the group consisting of answering a call, dismissing a call, silencing a ringer, sending a call to voicemail, turning on a screen, waking up the electronic device, viewing the time, scrolling a screen, scrolling through photos, panning a map, magnifying a view, switching audio mode, setting audio level, steering audio toward the person's location, steering camera toward the person's location, and altering device functionality based on distance between the person and the device.

15. The electronic device of claim 1, wherein:
when the first IR sensor detects heat emitted by a person received via a first opening of the first plurality of openings, the first IR sensor generates a first signal;
when the first IR sensor detects heat emitted by the person received via a second opening of the first plurality of openings, the first IR sensor generates a second signal; and
the electronic device further comprises a processor configured to detect motion of the person based on a relative change of the first and second signals.

16. The electronic device of claim 15, wherein:
the processor is further configured to carry out a function in response to the first and second generated signals; and
the function is selected from the group consisting of answering a call, dismissing a call, silencing a ringer, sending a call to voicemail, turning on a screen, waking up the electronic device, viewing the time, scrolling a screen, scrolling through photos, panning a map, magnifying a view, switching audio mode, setting audio level, steering audio toward the person's location, steering camera toward the person's location, and altering device functionality based on distance between the person and the device.

17. An electronic device comprising:
a housing comprising:
a top surface having a first corner diagonally opposite a second corner, and a third corner diagonally opposite a forth corner;
a first opening formed on the first corner of the top surface; and
a second opening formed on the second corner of the top surface;
a first infrared ("IR") sensor proximate to the first corner and having an unobstructed path and line of sight to outside the housing via the first opening; and
a second IR sensor proximate to the second corner and having an unobstructed path and line of sight to outside of the housing via the second opening.

18. The electronic device of claim 17, wherein each of the first IR sensor and the second IR sensor comprises a thermopile sensor configured to detect emitted heat having a wavelength that ranges between about 5 to about 100 micrometers.

19. The electronic device of claim 17, wherein:
when the first IR sensor detects heat emitted by a person received via the first opening, the first IR sensor generates a signal;
the electronic device further comprises a processor configured to detect presence of the person based on the generated signal.

20. The electronic device of claim 19, wherein:
the processor is further configured to carry out a function in response to the first and second generated signals; and
the function is selected from the group consisting of answering a call, dismissing a call, silencing a ringer, sending a call to voicemail, turning on a screen, waking up the electronic device, viewing the time, scrolling a screen, scrolling through photos, panning a map, magnifying a view, switching audio mode, setting audio level, steering audio toward the person's location, steering camera toward the person's location, and altering device functionality based on distance between the person and the device.

21. A method comprising:
generating, by a first infrared sensor of an electronic device, a first signal in response to detecting first heat from outside of a first plurality of openings formed in a first corner of a housing of the electronic device;

generating, by a second infrared sensor of the electronic device, a second signal in response to detecting second heat from outside of a second plurality of openings formed in a second corner of the housing of the electronic device that is diagonally opposite the first corner; and detecting, by the electronic device, based on the first signal and the second signal, presence of a user of the electronic device, wherein:

the first infrared sensor is proximate to the first corner with a first unobstructed path and line of sight to outside of the housing via the first plurality of openings;

the first plurality of openings is oriented toward the first infrared sensor in different directions;

the second infrared sensor is proximate to the second corner with a second unobstructed path and line of sight to outside of the housing via the second plurality of openings;

the second plurality of openings is oriented toward the second infrared sensor in different directions;

the housing includes a third corner diagonally opposite a fourth corner.

22. The method of claim 21, further comprising:
initiating a notification in response to detecting the presence of the user.

23. The method of claim 21, wherein the initiating of the notification comprises at least one of displaying a notification on a display unit of the device, emitting a notification sound from the device, and vibrating the device.

24. The method of claim 21, wherein the detecting of the presence comprises:
determining a position of the user with respect to the electronic device based on at least one of the first signal and the second signal; and
determining a distance between the user and the electronic device based on at least one of the first signal and the second signal.

25. The method of claim 24, further comprising:
adjusting a notification volume based on the position or the distance.

26. The method of claim 25 wherein the adjusted notification volume does not exceed an initial notification volume.

27. The method of claim 24, further comprising:
changing a type of notification based on the position or the distance.

28. The method of claim 27, further comprising:
repeating the initiated notification based on the position or the distance.

29. A method comprising:
generating, by a first infrared sensor of an electronic device, a first signal in response to detecting first heat from outside of a first plurality of openings formed in a first corner of a housing of the electronic device;

generating, by a second infrared sensor of the electronic device, a second signal in response to detecting second heat from outside of a second plurality of openings formed in a second corner of the housing of the electronic device that is diagonally opposite the first corner of the housing, wherein the housing includes a third corner diagonally opposite a fourth corner; and detecting, by the electronic device, based on the first signal and the second signal, presence of a user of the electronic device; and detecting, based on a relative change of the first signal and the second signal, motion of a user of the electronic device, wherein:

the first infrared sensor is proximate to the first corner with a first unobstructed path and line of sight to outside of the housing via the first plurality of openings;

the first plurality of openings are oriented toward the first infrared sensor in different directions;

the second infrared sensor is proximate to the second corner with a second unobstructed path and line of sight to outside of the housing via the second plurality of openings;

the second plurality of openings are oriented toward the second infrared sensor in different directions.

* * * * *